United States Patent
Nonaka et al.

[11] 3,846,572
[45] Nov. 5, 1974

[54] REDUCING OIL CONTENT OF FRIED POTATOES BY IMMERSING IN OIL-FREE DIFLUORODICHLOROMETHANE

[75] Inventors: Masahide Nonaka, Moraga; Earl Hautala, Richmond; Merle L. Weaver, Martinez, all of Calif.

[73] Assignee: The United States of America as represented by the Secretary of Agriculture, Washington, D.C.

[22] Filed: Oct. 18, 1971

[21] Appl. No.: 190,007

[52] U.S. Cl................ 426/429, 426/441, 426/524, 426/438, 426/518
[51] Int. Cl............................................ A23l 1/12
[58] Field of Search......... 99/1, 100, 193, 194, 197, 99/198, 103; 260/412, 412.8; 426/417, 425, 429, 438, 441, 506, 524

[56] References Cited
UNITED STATES PATENTS

| | | | |
|---|---|---|---|
| 1,199,124 | 9/1916 | Snelling | 426/438 |
| 2,560,935 | 7/1951 | Dickinson | 260/412.4 |
| 2,564,409 | 8/1951 | Rubin | 260/412.8 |
| 3,127,271 | 3/1964 | Goulston | 99/100 P |
| 3,436,229 | 4/1969 | Simpson | 99/100 P |
| 3,592,666 | 7/1971 | Butler | 426/524 |
| 3,594,188 | 7/1971 | Huxsall | 426/441 |
| 3,627,535 | 12/1971 | Davidson | 99/100 |
| 3,649,305 | 3/1972 | Wilder | 426/441 |
| 3,664,146 | 5/1972 | Butts | 99/198 |
| 3,669,685 | 6/1972 | Weaver | 99/198 |

*Primary Examiner*—Norman Yudkoff
*Assistant Examiner*—Martin G. Mullen
*Attorney, Agent, or Firm*—M. Howard Silverstein; Max D. Hensley; William Takacs

[57] ABSTRACT

Potato strips are immersed in difluorodichloromethane at minus 21.6° F. for 11 seconds prior to being leached in water at 125° F. for 20 minutes in order to effect maximum crispness and rigidity in the final product. Said strips are then par-fried and subsequently immersed with agitation in oil-free difluorodichloromethane at minus 21.6° F. for 1 to 2 minutes, thereby freezing concomitantly with oil extraction. The nutritive properties of the fried potato strips are improved by the removal of excess oil by said extaction.

1 Claim, 1 Drawing Figure

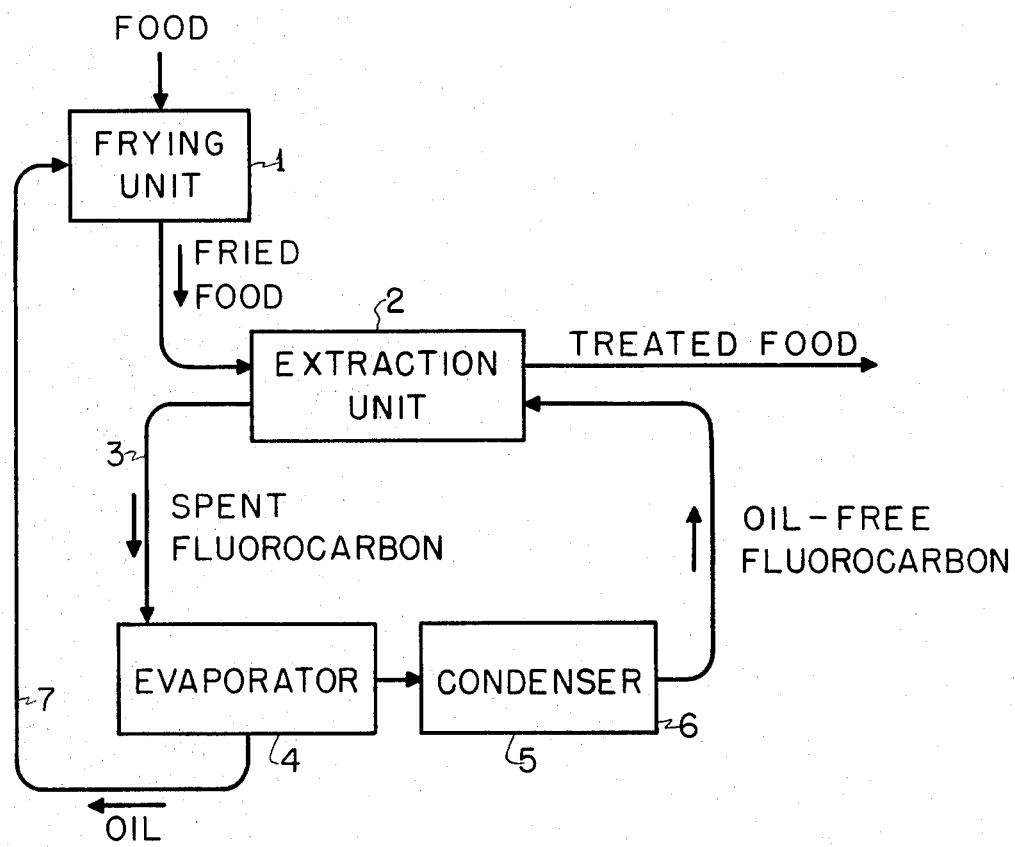

REDUCING OIL CONTENT OF FRIED POTATOES BY IMMERSING IN OIL-FREE DIFLUORODICHLOROMETHANE

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

The invention relates to and has among its objects the provision of novel processes for improving the nutritive and other properties of fried food products, in particular by reducing the oil content thereof. Further objects of the invention will be evident from the following description wherein parts and percentages are by weight unless otherwise specified. The terms "fat" and "oil" are used synonymously herein as designating an edible glyceride whether normally solid or liquid.

The single FIGURE in the annexed drawing is a flow sheet illustrating an embodiment of the process of the invention.

Conventional fried food products generally contain a high proportion of oil derived from that used in the frying operation. A high oil content is a disadvantage to both the food processor and the consumer. For the processor, it means excessive operating costs in replenishing the oil lost from the cooking bath. For the consumer, it means that the nutritive value of the food is offset by a too high fat content. To obtain a given quantity of protein, starch, sugar, or other non-fat nutriment, the consumer necessarily receives the high proportion of fat. This in turn limits the consumption of fried foods in that persons on fat-restricted diets cannot consume fried foods or at least can consume them only in very limited quantities. Another disadvantage of conventional fried foods is that much of the oil is in the surface layers of the products so that they leave oily smears on everything they contact such as the fingers of the consumer, plates, cutlery, etc. This is another deterrent to the consumption of fried foods--many persons find them too messy to be served at other than informal occasions such as picnics, fairs, or other outdoor gatherings.

In conventional production of fried foods, the fat content of the products is not subject to control to any substantial degree. Procedures such as draining the product on a screen for a time after frying and/or blowing hot air against the freshly fried products merely serve to remove loose droplets of oil--they cannot remove the oil which is enmeshed in the product. Thus, products which have been produced by procedures which include draining or hot air-blowing operations still contain excessive amounts of oil and are subject to the disadvantages outlined above.

A primary object of the invention is the provision of means for obviating the above problems. By application of the invention one can readily remove excess oil from fried food products of all kinds whereby to yield products of improved nutritive balance and which do not leave oily smears on objects with which they come into contact. Additionally, the invention makes it possible to recover the removed oil so that it may be used in frying additional batches of food materials.

Another advantage of the invention is its ease of application. No disruption of normal processing procedures is required.

Another advantage of the invention is that the appearance, texture, and flavor of the product is improved. The product no longer looks or feels greasy or oily. In addition, less surface oil means that the product will be more stable to oxygen. Resistance to oxidative deterioration (rancidity) means a longer shelf-life for the material.

Still another advantage of the invention is that sanitation during the preparation of fried food products becomes less difficult. Oil can contaminate equipment, packaging material, and general work areas. A reduction of oil means fewer work stoppages for cleaning purposes and therefore more productivity.

In the following description, emphasis is directed to the treatment of fried potato products. Reference to such particular material is, however, made by way of illustration and not limitation. In its broad ambit the invention is applicable to fried food products of all kinds, including those made from corn, rice, wheat, barley, oats and other cereals, onion, carrot, beet, sweet-potato, celery, pork rind, meats, fish, protein-supplemented meats, and the like.

Basically, the process of the invention involves contacting the fried product with a fluorocarbon liquid whereby excess oil on the surface of the product and enmeshed in surface layers thereof is removed. The preparation of the fried product to which the invention is applied forms no part of the invention, and the product can be prepared in any of the ways well known in the art of cookery.

In a typical practice of the invention fried potatoes are prepared in conventional manner: Raw potatoes are peeled, cut into strips, blanched, and fried in hot oil. The fried potatoes are then contacted with a fluorocarbon liquid whereby excess oil is removed therefrom. Usually, the contacting is achieved by feeding the fried potatoes into a pool of the fluorocarbon and applying agitation to enhance good contact of the liquid with all the surfaces of the material under treatment. Other means of contacting can be used such as spraying or flooding the fluorocarbon over the material while it is supported on metal screening or the like. It is obvious that such factors as time of contact, degree of agitation, etc. may be varied to attain an oil reduction of desired degree. In general, an increase in such conditions as time of contact and degree of agitation will result in a greater degree of oil removal.

The fluorocarbons used in accordance with the invention are volatile substances. This means that when contact of the product therewith is terminated, any residual fluorocarbon on the product is quickly vaporized. In many cases no special provision needs to be taken to ensure removal of fluorocarbon from the product as the vaporization occurs almost instantaneously as the pieces of material are removed from the pool of fluorocarbon. This is particularly the case where the fluorocarbon is one which has a boiling point below room temperature. Residual heat in the treated pieces may also be utilized to attain rapid removal of residual fluorocarbon. For example, fried products while still hot from the frying operation may be contacted with the fluorocarbon. When the contact is terminated, residual heat in the product quickly vaporizes any residual fluorocarbon thereon.

If desired, however, the treated products can be heated to ensure complete removal of the fluorocarbon. The heating may be at temperatures from room temperature up to about 350°F, and may be effectuated in various ways--for example, by exposing the products to infra-red lamps or other hot body, by contacting them with a current of warm air, or by heating in an oven.

Following contact with the fluorocarbon liquid and vaporization of any residual portion of such liquid from surfaces of the product, the treated product may be further handled in any conventional or desired manner. For example, it may be consumed directly, stored for future use, frozen for long periods of preservation, etc.

Difluorodichloromethane is preferred for use as the fluorocarbon. However, the invention encompasses the use of any fluorocarbon which is highly volatile, that is, which has a boiling point less than 75° F., preferably less than 0° F. Typical fluorocarbons which may be used in accordance with the invention are listed in the following table.

tion in oil content. The process not only accomplishes freezing at the same time as reducing the oil content, but also assures minimal moisture loss. Because of the very rapid rate of freezing, there is no chance for moisture to be lost by evaporation. This is opposed to moisture losses of 3–5 percent reported for conventional freezing methods.

In a practice of this phase of the invention, the same procedure as described above is employed and the fluorocarbon is selected from those which have boiling points below 0° F. Difluorodichloromethane is a typical, indeed preferred, example thereof. It is evident that in a practice of this phase of the invention, the fried material is kept in contact with the fluorocarbon liquid for a period long enough to freeze it--this will additionally ensure removal of excess oil from the product. In a variation of this aspect of the invention, the contact of the fried product and cold liquid fluorocarbon is continued long enough to attain reduction of oil content coupled with a partial freezing of the product. The contact is then terminated and then the freezing is

| Solvent | Formula | Boiling point °F. | °C. |
|---|---|---|---|
| Tetrafluoromethane | $CF_4$ | -198.4 | -128.0 |
| Trifluoromethane | $CHF_3$ | -115.7 | -82.1 |
| Trifluoromonochloromethane | $CClF_3$ | -114.6 | -81.4 |
| Hexafluoroethane | $CF_3-CF_3$ | -108.8 | -78.2 |
| Trifluoromonobromomethane | $CBrF_3$ | -72.0 | -57.8 |
| Difluoromonochloromethane | $CHClF_2$ | -41.4 | -40.8 |
| Pentafluoromonochloroethane | $CClF_2-CF_3$ | -37.7 | -38.7 |
| Difluorodichloromethane | $CCl_2F_2$ | -21.6 | -29.8 |
| 1,1-Difluoroethane | $CH_3-CHF_2$ | -11.2 | -24.0 |
| Symmetrical tetrafluorodichloroethane | $CClF_2-CClF_2$ | 38.4 | 3.6 |
| Monofluorodichloromethane | $CHCl_2F$ | 48.1 | 8.9 |
| Monofluorotrichloromethane | $CCl_3F$ | 74.9 | 23.9 |
| Octafluorocyclobutane | cyclo-$(CF_2)_4$ | 21.1 | -6.0 |

It will be noted from the foregoing table that most of the fluorocarbons are normally gases. This means that to maintain them in a liquid state--required for a practice of the invention--they must be cooled to a temperature below their boiling point.

The fluorocarbons which need be cooled to low temperatures to maintain them in the liquid state offer the special benefit that they may be used to attain oil removal with concomitant freezing of the product under treatment. Many fried products are frozen to preserve them for future use and hence it is advantageous to be able to accomplish freezing at the same time as reduccompleted by subjecting the product to a cold (−34° F.) air blast or by placing it in a conventional freezer cabinet, for example, one maintained at −10° or −20° F.

Hereinabove, it has been noted that the fluorocarbon liquid applied to the fried food must be in an essentially oil-free condition. This is necessary so that the desired removal of oil from the food will take place. If, on the other hand, the oil is not removed from the fluorocarbon, an equilibrium condition will be attained whereby the oil content of the treated food will be the same as before contact with the fluorocarbon. In other words, accumulation of oil in the fluorocarbon is undesirable as it impedes the ability of the fluorocarbon to remove oil from the food product under treatment.

To secure the desired objective of maintaining the fluorocarbon in an essentially oil-free condition, we apply an oil separation procedure to the pool of fluorocarbon used for contacting the fried food. One technique of attaining the oil separation is based on the principle that the fluorocarbon is volatile whereas the oil is not. An application of this technique may take the following form: The fluorocarbon after having contacted the fried food is subjected to evaporation. The fluorocarbon vapors are condensed and recycled for treating an additional quantity of fried food. The oil remaining as a residue from the evaporation step is recycled to be used for frying an additional quantity of food. Moreover, although such distillation procedure is preferred for de-oiling the spent fluorocarbon liquid, it is obvious that other oil separation techniques can be used. For example, the fluorocarbon liquids are generally poor solvents for oil and by applying cooling, the oil can be precipitated out of solution. As an illustration, where difluorodichloromethane is used as the fluorocarbon liquid, cooling thereof to about −40° F. will cause the oil to be solidified whereby it can be removed from the fluorocarbon liquid by filtration, centrifugation, or decanting. The resulting oil-free fluorocarbon is then recycled for treatment of further quantities of fried food; the separated oil is recycled for frying further quantities of the food in question.

Attention is now directed to the annexed drawing which illustrates application of the invention with continuous treatment of fried food to decrease its oil content, and concomitant continuous treatment of the spent fluorocarbon liquid.

Reference numeral 1 designates a frying unit where a food is fried in conventional manner in hot oil.

From frying unit 1, the fried food is directed to extraction unit 2 wherein the fried food is contacted with a fluorocarbon liquid to decrease its oil content. Extraction unit 2 may take the form, for example, of a tank for holding the fluorocarbon liquid and a mesh belt for conveying the fried food pieces through the pool of fluorocarbon liquid. Preferably, the fried food pieces are conveyed through unit 2 counter currently to the flow of liquid fluorocarbon therethrough.

The fluorocarbon liquid which has contacted the fried food is directed by conduit 3 to evaporator 4 where the liquid is heated to vaporize the fluorocarbon. The fluorocarbon vapors then pass to condenser 5 and the liquefied fluorocarbon, now in an oil-free condition, is recycled via conduit 6 to extractor 2 for treating additional quantities of fried food.

The oil which remains as a residue in evaporator 4 is directed by conduit 7 to frying unit 1 wherein it is utilized for frying additional quantities of the incoming food.

In our copending application Ser. No. 164,037, filed July 19, 1971, now Pat. No. 3,729,323, the disclosure of which is incorporated herein by reference, we describe a process for producing fried potato products of enhanced texture, rigidity, and color. In said process, raw potatoes are cut into suitable pieces such as strips and these strips are subjected to a series of operations: (a) The strips are contacted with a liquid refrigerant at a temperature below 0° F. for a limited period of time so that essentially only surface layers of the strips are frozen. (b) The so-treated strips are then leached with warm water for a period of about 10 to 20 minutes. (c) Next, the strips are par-fried in hot oil. (d) Finally, the strips are frozen to at least a superficial extent, that is, so that essentially only surface layers are frozen, or to such an extent as to attain total freezing of the strips. The resulting products can be preserved for future use by holding them at cold storage temperatures, or in the frozen state at sub-freezing temperatures. When they are to be prepared for the table they are given a finish-fry in hot oil or heated in an oven.

The process of the present invention can be incorporated with that of the said prior application. To this end, the hereindescribed fluorocarbon treatment can be applied as the freezing step (d, above) to attain surface-limited or total freezing of the par-fried strips, and with the advantage of attaining a removal of excess oil from the said par-fried strips. Alternatively, the hereindescribed fluorocarbon treatment can be applied to finishfried products of the said prior application in order to remove excess oil therefrom, with or without any freezing of the product as may be controlled by suitable adjustment of the conditions of the fluorocarbon treatment.

EXAMPLES

The invention is further demonstrated by the following illustrative examples.

Example 1

Par-fried potatoes were prepared by a standard commercial process: Potatoes were peeled, cut into strips, blanched for 15 minutes in water at 150° F., post-blanched for 3 minutes in water at 180° F., and finally fried for 1 minute in oil at 320° F.

A portion of the fried product was removed and its oil content determined.

The remainder of the fried product while still warm was immersed for 1 minute in a bath of oil-free difluorodichloromethane at −21.6° F. The treated pieces were then removed from the bath and their oil content determined. The results are tabulated below:

| Oil content, % | Reduction in oil content, % |
|---|---|
| Before treatment 4.3 | — |
| After treatment 2.5 | 42 |

A portion of the product was prepared for the table by heating it in an oven at about 450° F. The product was found to have an excellent taste—no foreign taste or odor could be detected. Also, the product when handled did not leave any oily smears on the fingers.

Example 2

In this instance, par-fried potatoes were prepared, using the procedure of our prior application Ser. No. 164,037, filed July 19, 1971, now Pat. No. 3,729,323.

Potatoes were peeled, cut into strips, and the strips were given a surface freeze by immersing them for 11 seconds in difluorodichloromethane at −21.6° F. The strips were leached with warm (125° F.) water for 20 minutes, then par-fried for 1 minute in oil at 323° F. A portion of the par-fries was reserved for oil determination. The remainder was divided into four lots. Each of these lots was immersed in oil-free difluorodichloromethane at −21.6° F., with variation as to time of immersion and with or without agitation in the fluorocarbon liquid. After such treatment the products were tested for oil content. The conditions used and the results attained are tabulated below:

| Sample | Treating conditions | | Oil content, % | Reduction in oil content, % |
|---|---|---|---|---|
| | Time, min. | Agitation | | |
| Untreated | — | — | 3.65 | — |
| Lot 1 | 2 | Yes | 1.5 | 57 |
| Lot 2 | 1 | Yes | 1.8 | 52 |
| Lot 3 | 0.25 | Yes | 2.1 | 41 |
| Lot 4 | 0.5 | No | 2.5 | 34 |

Portions of the product of Lots 1, 2, 3, and 4 were prepared for the table by heating in an oven at about 450° F. They were found to have excellent taste; no foreign odor or taste could be detected. Moreover, the products when handled did not leave any oily smears on the fingers.

Example 3

Removal of excess oil from potato chips

A quantity of commercial potato chips was tested for oil content and divided into two lots, each lot being treated as follows:

Lot 1: The chips were heated in an oven at 320° F. for 5 min. While still hot they were immersed in oil-free difluorodichloromethane at −21.6° F. and vigorously agitated therein for 15 seconds. The chips were then removed and the oil content determined.

Lot 2: The chips (without applying any heating) were immersed in oil-free difluorodichloromethane at −21.6° F. and vigorously agitated therein for 2 min. The chips were then removed and warmed in an oven at 250° F. for 5 min. to vaporize any residue fluorocarbon. The oil content of the product was then determined.

The results were tabulated below:

| Sample | Oil content, % | Reduction in oil content, % |
|---|---|---|
| Untreated | 34.5 | — |
| Lot 1 | 21.1 | 39 |
| Lot 2 | 22.8 | 34 |

The products could be handled without leaving any oily smears, and they were free from any foreign odor or taste. Product appearance was also improved. The treated chips were lighter and more uniform in color by virtue of the fact that the blotchy, oily appearance of the original chips had been eliminated.

Example 4

Removal of excess oil from corn chips

A quantity of commercial corn chips were heated in an oven at 320° F. for 5 min. While still hot the chips were immersed in oil-free difluorodichloromethane at −21.6° F. for 1 min. The chips were removed, reheated in the 320° F. oven, and immersed in the oil-free difluorodichloromethane for 1 min. The chips were then removed and their oil content determined.

The results are tabulated below:

| Sample | Oil content, % | Reduction in oil content % |
|---|---|---|
| Untreated | 33.1 | — |
| Treated (single dip) | 25.2 | 24 |
| Treated (double dip) | 21.5 | 35 |

The products could be handled without leaving any oil stains, and were free from any foreign odor or taste.

Having thus described our invention, we claim:

1. A process for preparing fried potato products of decreased oil content, which consists of
   a. cutting peeled potatoes into strips,
   b. imparting a surface freeze to the strips by immersing them for 11 seconds in difluorodichloromethane at −21.6° F.,
   c. leaching the strips in water at 125° F. for 20 minutes,
   d. par-frying the strips in oil at 323° F. for 1 minute, and
   e. immersing the strips with agitation in oil-free difluorodichloromethane at −21.6° F. for 1 to 2 minutes.

* * * * *